United States Patent [19]
Shopp

[11] Patent Number: 6,111,694
[45] Date of Patent: Aug. 29, 2000

[54] CASING FOR PROJECTION SCREEN SYSTEM

[75] Inventor: Rick A. Shopp, New Castle, Ind.

[73] Assignee: Draper, Inc., Spiceland, Ind.

[21] Appl. No.: 08/862,981

[22] Filed: May 23, 1997

[51] Int. Cl.[7] .......................... G03B 21/56; E04F 10/06; E06B 9/08
[52] U.S. Cl. ............................ 359/461; 160/23.1
[58] Field of Search ................... 359/443, 450, 359/461; 396/3; 160/19, 23.1

[56] References Cited

U.S. PATENT DOCUMENTS

| | | | |
|---|---|---|---|
| 1,731,124 | 10/1929 | Carper | 160/108 X |
| 3,640,603 | 2/1972 | Balmes | 350/124 |
| 3,996,987 | 12/1976 | Rodriguez | 160/19 |
| 4,045,123 | 8/1977 | Brown | 350/117 |
| 4,059,339 | 11/1977 | Brown | 350/117 |
| 4,060,310 | 11/1977 | Brown | 350/117 |
| 4,072,404 | 2/1978 | Brown | 350/117 |
| 4,110,003 | 8/1978 | Zinn | 350/117 |
| 4,159,162 | 6/1979 | Christoffel | 350/117 |
| 4,169,658 | 10/1979 | Brown | 350/118 |
| 4,254,813 | 3/1981 | Vecchiarelli | 160/19 |
| 4,399,855 | 8/1983 | Volfson | 160/23 R |
| 4,580,361 | 4/1986 | Hillstrom et al. | 40/603 |
| 4,739,567 | 4/1988 | Cardin | 40/471 |
| 4,935,988 | 6/1990 | Ford et al. | 16/87.4 R |
| 5,296,964 | 3/1994 | Shopp | 359/443 |
| 5,581,401 | 12/1996 | Takamoto et al. | 359/443 |
| 5,855,235 | 1/1999 | Colson et al. | 160/121.1 |

OTHER PUBLICATIONS

Product brochure entitled "Products for Visual Communication," by Draper Shade & Screen Co., Inc. of Spiceland, IN, 1995.

*Primary Examiner*—Eddie C. Lee
*Assistant Examiner*—Christopher E. Mahoney
*Attorney, Agent, or Firm*—Baker & Daniels

[57] ABSTRACT

A casing for a projection screen system that includes a fascia removable from the spine of the casing without the use of tools. The casing is provided with a roll locking hinge formed by a cooperating lip and socket furnished on the fascia and the spine. The roll locking hinge is configured to permit the fascia to be preliminarily mated with the spine when the fascia is disposed in an upwardly rotated arrangement. After the preliminary mating of the fascia with the spine, when subsequently rotated downward relative to the spine, the fascia is locked to the spine by the roll locking hinge, thereby preventing inadvertent fascia removal.

11 Claims, 6 Drawing Sheets

CASING FOR PROJECTION SCREEN SYSTEM

BACKGROUND OF THE INVENTION

The present invention pertains to projection screen systems, and, in particular, to a projection screen system casing that houses a roller around which the projection screen is wound.

Projection screen systems in numerous forms are gaining frequent application in a variety of venues, including conference rooms and home entertainment systems. Projection screen systems typically include a protective casing that mounts and houses a roller around which is wrapped a projection screen. Depending on the direction of rotation of the roller, the projection screen either unwinds from around the roller to descend below the casing to a lowered, viewing arrangement, or winds around the roller to a raised, storage position. This roller rotation may be performed manually or by an electrically powered motor attached to the roller.

In some projection screen systems, the casing is installed at a visible location within the room, such as on a vertical wall at a height slightly below the ceiling. In casings of these systems, the room facing facade or fascia of the casing is frequently designed so as to be removable from the remainder of the casing. This fascia removability facilitates access to the system componentry housed within the casing, which in turn potentially reduces the time and therefore the labor costs associated with repairing or maintaining the system. Moreover, this fascia removability enables a given fascia to be replaced with a differently colored or textured fascia should the room in which the projection screen system is installed be redecorated.

One known projection screen system casing that includes a removable fascia is disclosed in U.S. Pat. No. 5,296,964. That casing advantageously allows for the fascia to be removed without the use of any tools. While that casing is useful in a wide range of situations, one disadvantage of that casing design is that the casing end caps fit over the ends of the fascia when assembled. Although this end cap construction aids in preventing the fascia from unintentionally being detached from the remainder of the casing, the end caps must be removed prior to removal of the fascia. In certain situations, such as when little clearance space is present between the room walls and the ends of the casing, the need to remove the end caps may significantly complicate fascia removal. Still further, the overlapping of the fascia by the end caps may not be aesthetically pleasing to some customers.

Thus, it would be desirable to provide a projection screen system casing that overcomes these and other shortcomings of the prior art.

SUMMARY OF THE INVENTION

The present invention provides a projection screen system casing with a fascia that may be attached to the rest of the casing in a secure fashion so as to prevent its inadvertent dislodgement or detachment from the casing if bumped or jarred after installation. Furthermore, the fascia may be removed from the rest of the casing without tools and without removing the end caps of the casing so as to allow more ready access to the system components housed within the casing.

In one form thereof, the present invention provides a projection screen system casing that includes a spine and a removable fascia. The spine includes a top wall comprising a first attachment module. The removable fascia covers a projection screen mounting roller positioned below the spine top wall and includes a second attachment module. The first and second attachment modules comprise a locking lip and a socket adapted to receive the locking lip. The locking lip and socket are structured and arranged such that the locking lip is insertable a first distance into the socket when the fascia is arranged in a first position relative to the spine, and such that the locking lip is insertable a second distance greater than the first distance into the socket when the fascia is pivoted about the spine from the first position to a second position, whereby the first and second attachment modules are preliminarily mated together when the locking lip is inserted in the socket and the fascia is disposed in the first position so as to allow removal of the fascia from the spine, and whereby the first and second attachment modules are locked together when the locking lip is inserted in the socket and the fascia is disposed in the second position to prevent inadvertent removal of the fascia from the spine In another form thereof, the present invention provides a projection screen system casing including a spine and a removable fascia. The spine comprises a top wall including a first wall portion. The removable fascia covers a projection screen mounting roller positioned below the spine top wall and comprises a first fascia portion. The first wall portion and the first fascia portion comprise roll locking hinge means for installing the fascia to the spine when the fascia is pivoted relative to the spine about the first wall portion from a first position, whereat the first fascia portion and the first wall portion are preliminarily mated, to a second position, whereat the first fascia portion and the first wall portion are interlocked to prevent inadvertent fascia dislodgement.

One advantage of the present invention is that it provides a removable case fascia that is easy to install in a secure fashion.

Another advantage of the present invention is that a locking hinge employed between the fascia and the casing spine prevents the fascia from being dislodged by an inadvertent force being applied to the installed fascia.

Still another advantage of the present invention is that the casing fascia may be removed to allow servicing of the projection screen and roller assembly without removing the casing end caps, thereby allowing the system to be installed in a smaller space with minimal clearance on either end without sacrificing screen accessibility.

Still another advantage of the present invention is that the casing end caps do not overlay the fascia when assembled, and consequently the casing surface may be made to appear substantially continuous.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
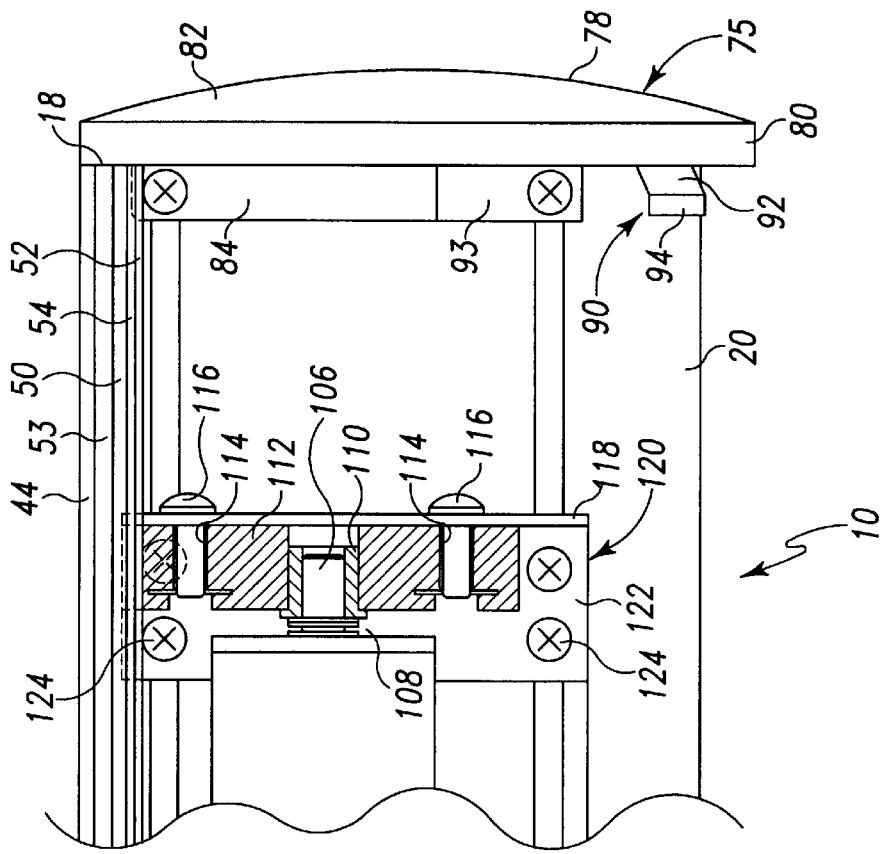
FIG. 1 is a fragmentary front view in partial cross-section of a projection screen system equipped with the casing of the prevent invention, wherein the casing fascia, the screen suspended dowel, and the circuitry for the electric motor are not shown for purposes of illustration.
Figure 1:
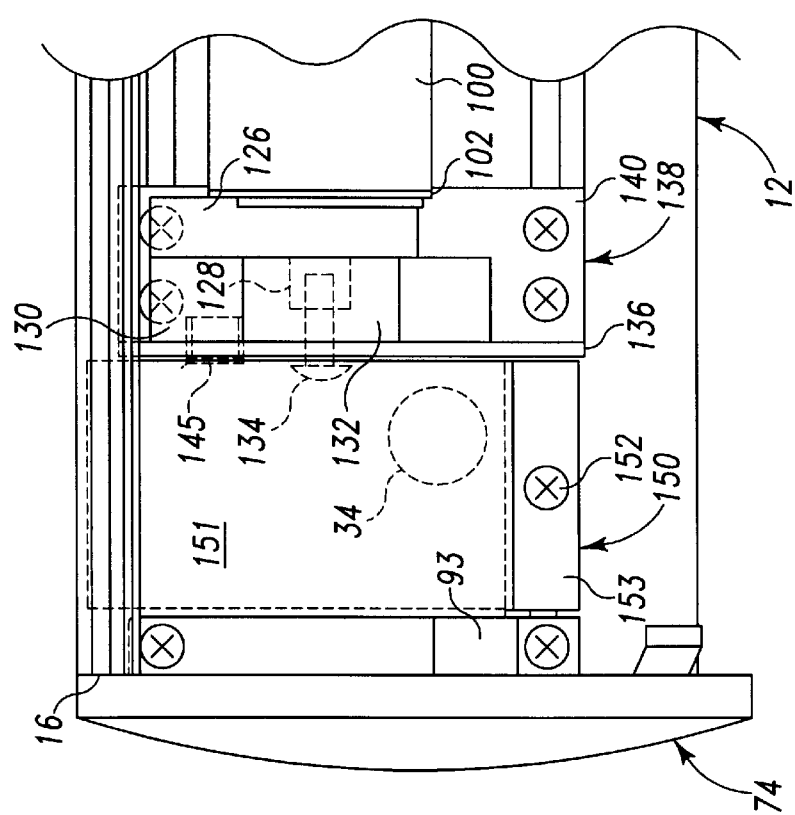

Corresponding reference characters indicate corresponding parts throughout the several views. Although the drawings represent an embodiment of the invention, the drawings are not necessarily to scale and certain features may be exaggerated or omitted in some of the drawings in order to better illustrate and explain the present invention.

DESCRIPTION OF THE PREFERRED EMBODIMENTS

Figure 2:
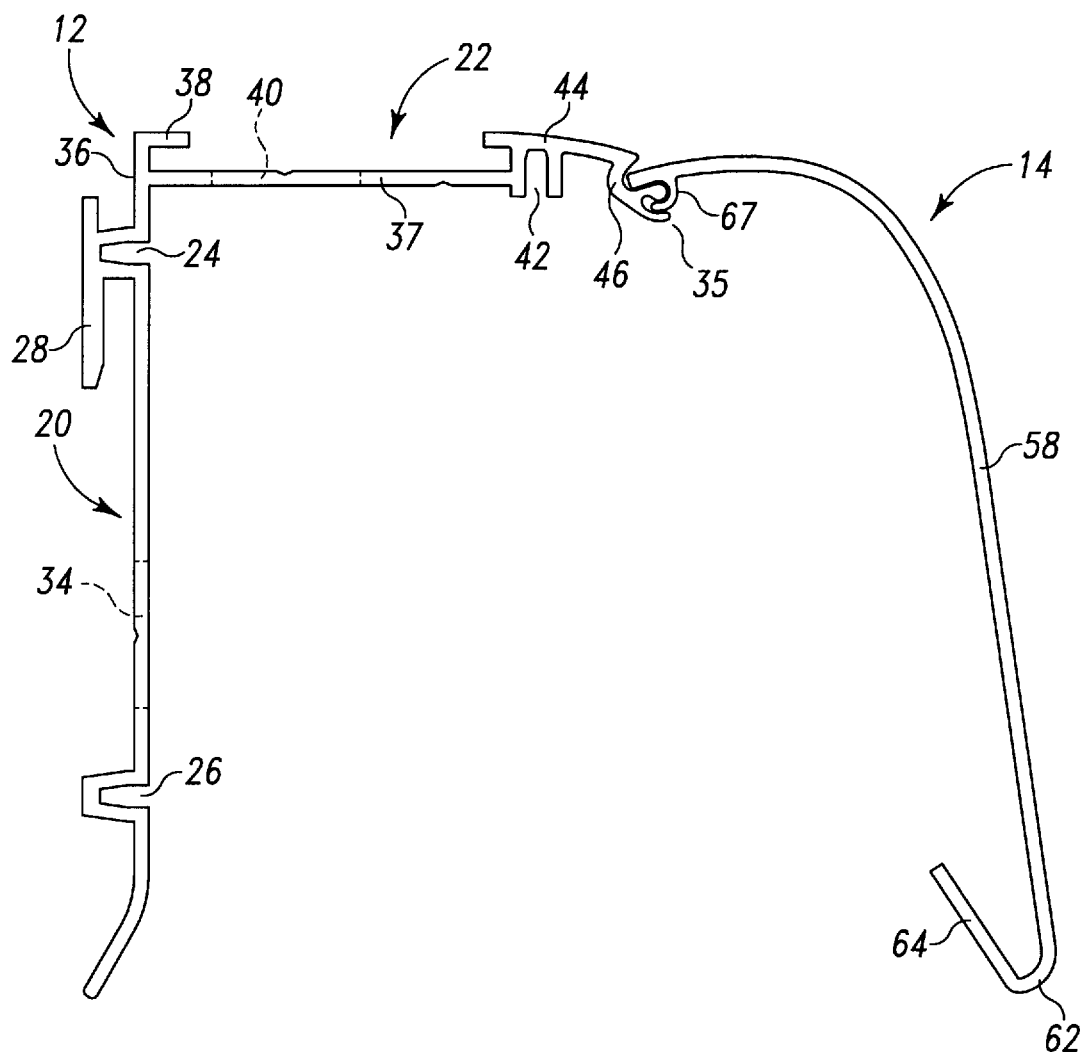
FIG. 2 is an end view of the casing spine and removable fascia shown separate from the remainder of the projection screen system, and wherein the fascia and spine are shown arranged at an initial stage of mounting the fascia to the spine.
Figure 5:
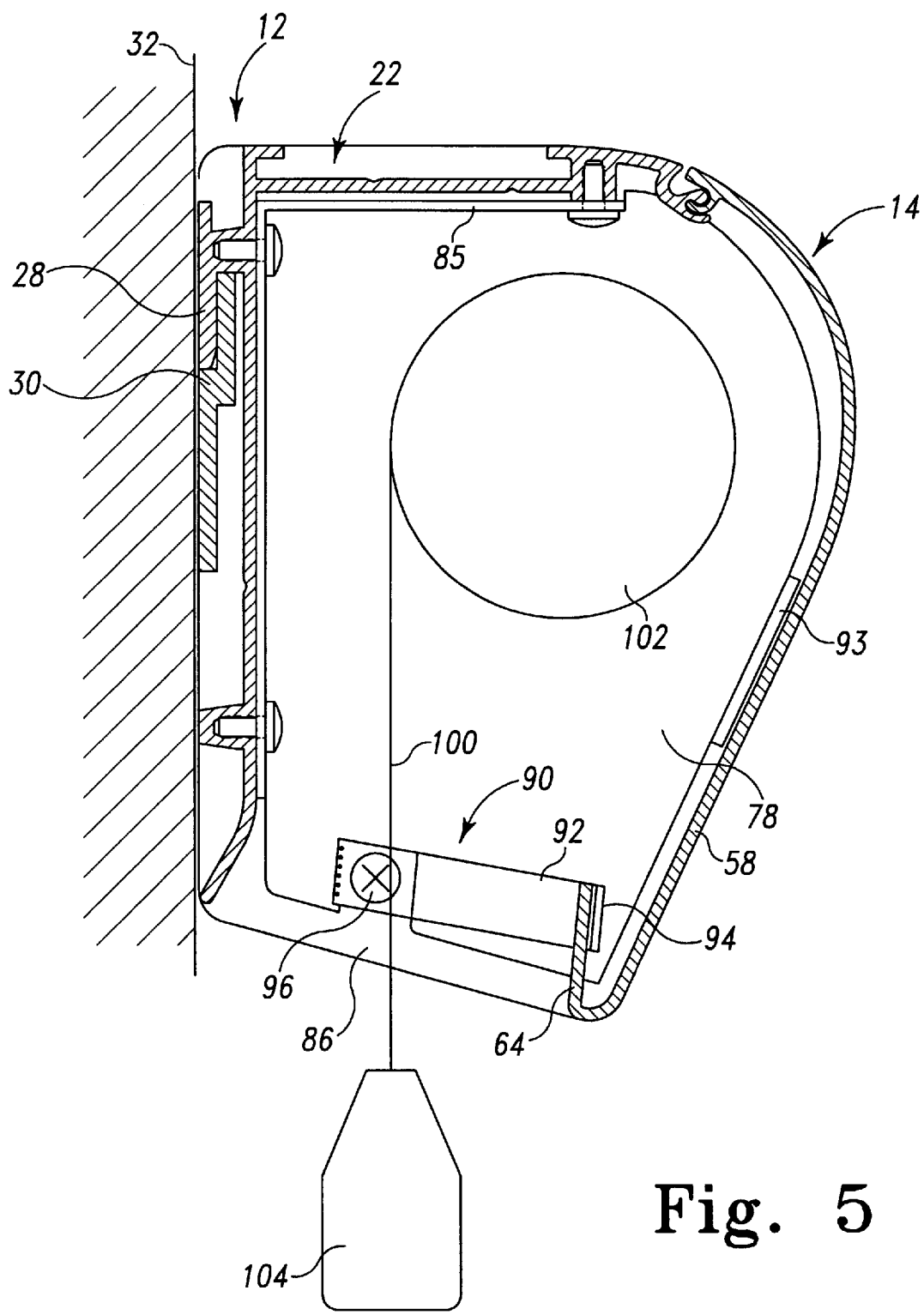
FIG. 5 is a cross-sectional view, taken along the line 5—5 of FIG. 4, further showing the installed casing, wherein the projection screen is diagrammatically shown unwinding from the screen mounting roller housed within the casing.

In FIG. 1, there is shown a front view in partial cross-section of selected portions of a projection screen system 10 that includes an exemplary embodiment of a casing or housing of the present invention. In FIG. 2, there is shown an end view of a casing spine, generally designated 12, and a casing fascia, generally designated 14, separate from the rest of system 10. Along the longitudinal length of spine 12 which extends from end 16 to end 18, and along the longitudinal length of fascia 14 which is coextensive with the spine length, spine 12 and fascia 14 are uniformly configured, and therefore their shapes shown in FIGS. 2 and 5 are representative.

With primary reference to FIG. 2, casing spine 12 is the support to which the remainder of the components of system 10 are assembled and includes a back wall or panel 20 and a top wall 22. Back wall 20 include an upper screw channel 24 and a lower screw channel 26. Formed into the back surface of screw channel 24 is a vertically extending flange 28. As shown in FIG. 5, flange 28 may be mounted to a longitudinally extending Z-bracket 30 secured to a building wall or beam shown at 32 to mount casing spine 12 in a room where projection screen system 10 is to be used. A circular hole 34 formed through back wall 20 allows electrical wires connected to a building's power supply to be introduced into the internal volume encased by the system casing.

Top wall 22 extends in depth between a forward edge 35 and a rearward edge 36 that intersects with back wall 20. Top wall 22 includes a planar body section 37 that projects from an upwardly extending L-shaped ridge 38 at wall edge 36. A circular access hole indicated in dashed lines at 40 allows electrical wiring to be routed through top wall 22 when system 10 is differently installed in other applications. The forward part of body section 37 terminates with screw channel 42. A segment 44 of the top wall that forms the upper end of channel 42 slopes downward in the forward direction to provide a curved profile as shown in FIG. 2.

Figure 3:
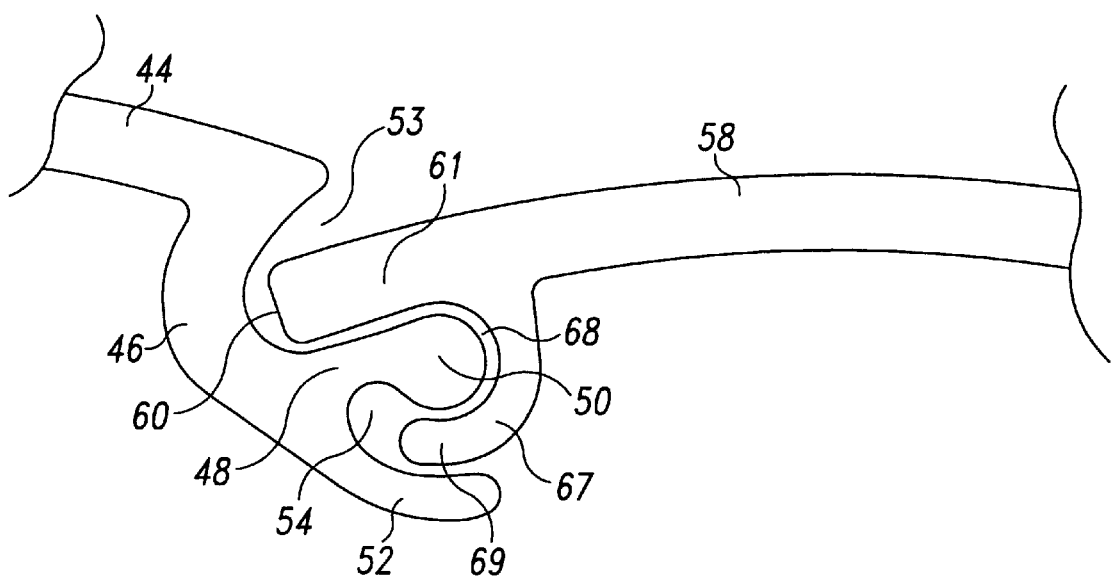
FIG. 3 is an enlarged view of a portion of FIG. 2 that shows the configuration of the roll locking hinge of the fascia and spine in further detail.

With additional reference to the enlarged view of FIG. 3, a curved wall segment 46 downwardly projects from the front end of top wall segment 44. First and second fingers 48 and 52 that together form a part of the roll locking hinge used to attach fascia 14 to casing spine 12 project generally forward from curved wall segment 46. The upper facing surface of finger 48 and curved wall segment 46 form a hollow or recess 53, which due to the downward offsetting of top wall segment 46 from wall segment 44 extends below the curved profile of segment 44. The bottom facing surface of the bulbous head portion 50 of finger 48 and the curved upper facing surface of finger 52 form an arcuate cavity or socket 54 adapted to receive a complementary shaped locking lip described below.

Casing spine 12 is fabricated from a lightweight yet strong and durable material, such as aluminum. Spine 12 is preferably formed in one-piece in an extrusion process, but may be formed in alternate fashions, such as by rigidly interconnecting separate panels or plates. Spine 12 may be configured, as well as installed, in alternate fashions within the scope of the invention. For example, extraneous portions of the casing spine could be eliminated to reduce weight and material. Furthermore, mounting flange 28 may be eliminated and spine 12 could be secured to the building by screws that pass through top wall 22 or back wall 20, or the casing end caps described below could be used to mount spine 12.

With reference to FIGS. 2 and 3, casing fascia 14 includes a gently curved body section 58 that extends from an upper edge 60 to a lower edge portion 62 that includes an upturned lip 64. A hook-shaped lip 67 that serves as a part of the fascia attaching roll locking hinge projects from the underside of body section 58 proximate upper edge 60. The shown spacing of lip 67 from edge 60 results in a short tip region 61 of body section 58 projecting beyond lip 67, and tip region 61 and lip 67 together form hollow 68. The tip region 69 of lip 67 is arcuate and shaped similar to and slightly smaller in thickness than socket 54. Lip 67 could be positioned exactly at edge 60, or farther from edge 60 than shown in the Figures, within the scope of the invention. As used herein and in the claims, language reciting an item as being "proximate" an object means that the item is either at or relatively near the object.

Fascia 14 is formed in one piece from a lightweight material, such as an extruded ABS plastic. As fascia 14 is the component of projection screen system 10 which faces into the room where system 10 is utilized and, unless the system is installed in a recess in the ceiling, is always readily visible, fascia 14 may be of a variety of colors and textures to fit the decor of that room.

Referring now to FIG. 1, the projection screen system casing further includes an end cap assembly 74 and an end cap assembly 75 that are installed at the opposite ends of casing spine 12. End cap assemblies 74 and 75 are mirror-images of each other. Therefore, the following further description of the structure of end cap assembly 75 will be appreciated to have equal application to the structure of end cap assembly 74.

As further shown in FIG. 5, end cap assembly 75 includes an end cap 78 formed in one piece from aluminum. End cap 78 includes a forward facing surface 80, a bowed end face 82, a longitudinally extending vertical mounting flange 84, a longitudinally extending horizontal mounting flange 85, and a vertically extending clip supporting flange 86.

Forward facing surface 80 includes a curved contour identical to fascia body section 58 so as to blend together when system 10 is fully assembled. End cap assembly 75 is installed to the system casing via screws that pass through vertical mounting flange 84 and horizontal mounting flange 85 and insert into back wall screw channels 24 and 26 and top wall screw channel 42. A fascia spring clip generally indicated at 90 includes a slat-shaped body 92 with a latching lip 94. Clip body 92 is fixedly attached to end cap flange 86 with screw 96 and angles inwardly such that lip 94 extends to a position in front of back wall 20. Spring clip 90 is made of stainless steel, and this material coupled with the clip shape affords clip 90 the resiliency to function as a leaf spring. In particular, and with directions taken in reference to FIG. 1, a force may be applied to clip 90 such that lip 94 is shifted from its rest position shown in FIG. 1 to the right, and the clip of end cap assembly 74 naturally may be shifted to the left, during fascia installation as described further below. When the shifting force is removed from clip 90, the resiliency of clip 90 tends to return it toward the position shown in FIG. 1. End cap 78 also includes an inwardly projecting tab 93 that extends in front of back wall 20 and that is used to limit the pivoting of fascia 14 during installation.

The components of projection screen system 10 which are mounted to and housed within the above described casing are best shown in the front view of FIG. 1. These components are only selectively shown in the Figures and briefly described herein as the construction of such components is not essential to an understanding of the present invention, and because any other suitable designs, including manually lowered and raised screens, that are known in the art may be substituted therefor.

A projection screen is formed from a sheet of fabric 100 that has a surface of the type of material on which images may be projected for viewing. Fabric sheet 100 is shown wrapped or wound around a cylindrical roller 102 and is unwindable therefrom upon roller revolution as shown in FIG. 5. The lower end of screen 100 is attached to a dowel 104 (See FIG. 5) that serves as a suspended weight that causes screen 100 to descend in a relatively planar configuration as it unwinds from roller 102.

An idler shaft 106 is fixed to one end of roller 102 to be rotatable therewith. Idler shaft 106 extends through spacing washers 108 and inserts into a flanged nylon bushing 110 press fit into a sound dampener 112 made of thermoplastic rubber. A pair of T-nuts 114 integrally molded into dampener 112 threadedly engage two screws 116 that extend through a side flange 118 of roller mounting bracket 120 to mount dampener 112 to the bracket. The back flange 122 of bracket 120 is attached to casing back wall 20 by four screws 124 that extend through back flange 122 and insert into screw channels 24 and 26.

The driven end of roller 102 is attached to the rotatable output shaft of motor 126 which drives the rotation of roller 102 to effect raising and lowering of screen 100 in a well known fashion. Motor 126 includes a square stud, shown in shadow at 128, that projects from the motor housing and inserts into a square throughbore provided in an aluminum finned insert (not shown) molded into a thermoplastic rubber dampener 130. The finned insert engages motor housing stud 128 to prevent relative rotation therebetween. Two opposite and laterally projecting portions 132 of dampener 130 have T-nuts (not shown) integrally molded therein. A pair of horizontally spaced screws 134 extending through side flange 136 of roller mounting bracket 138 threadedly engage the T-nuts to mount dampener 130 to bracket flange 136. The back flange 140 of bracket 138 is attached with screws to casing back wall 20 in a manner similar to the attachment of bracket 120.

A not shown electrical power cord extends from motor 126 and through a flanged bushing 145 and into a junction box indicated generally at 150. Bushing 145 is positioned behind dampener 130 and snap fits into a hole in the side wall of junction box 150. The building power supply (not shown) may be introduced into junction box 150 through access hole 34 in back wall 20 for electrical connection to the motor power cord. Junction box 150 is installed to the casing by aligning the upper edge of the junction box forward wall 151 within the top wall screw channel 42, and then by inserting screw 152 through a mounting flange 153 and into back wall screw channel 26.

The structure of the projection screen system casing will be further understood in view of the following explanation of its installation and operation. After the projection screen system is assembled as shown in FIG. 1 and installed into a building, the separate fascia 14 may be attached by an installer to casing spine 12 without the use of any tools. The first step of the fascia attachment process is for fascia 14 to be maneuvered to a position in front of and in closely spaced apart relationship with casing spine 12 such that the locking hinge components of the fascia and spine are generally aligned at a common height. After fascia 14 is then arranged in an installing orientation, which is an orientation rotated about forty degrees upward from its fully installed orientation, fascia 14 is moved generally rearward, or toward casing spine 12, and slightly downward. During this movement, fascia 14 is controlled such that tip region 69 of lip 67 inserts partially into socket 54, or only into the mouth of socket 54, and top wall finger 48 inserts into hollow 68. Recess 53 accommodates body section tip region 61 during this mating of the hinge components. This fascia rearward movement may continue until bulbous head portion 50 generally abuts the base of hook-shaped lip 67. At this point of fascia installation, the fascia 14 and casing spine 12 are arranged as shown in FIGS. 2 and 3, and are preliminarily mated so as to enable a hinge roll locking step to be performed to interlock the fascia and spine.

Figure 4:
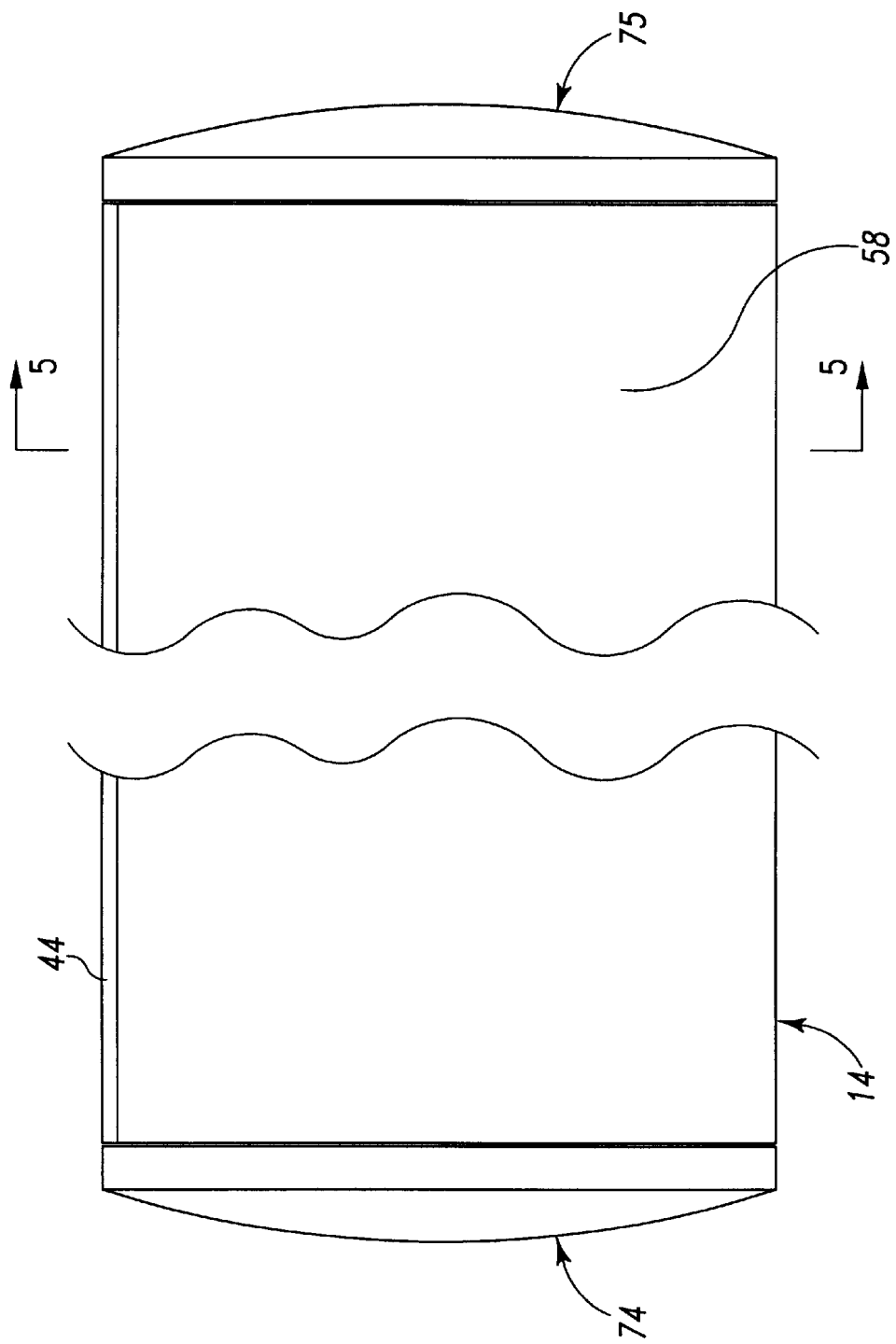
FIG. 4 is a fragmentary front view of the projection screen system of FIG. 1 after the complete installation of the removable fascia.
Figure 6:
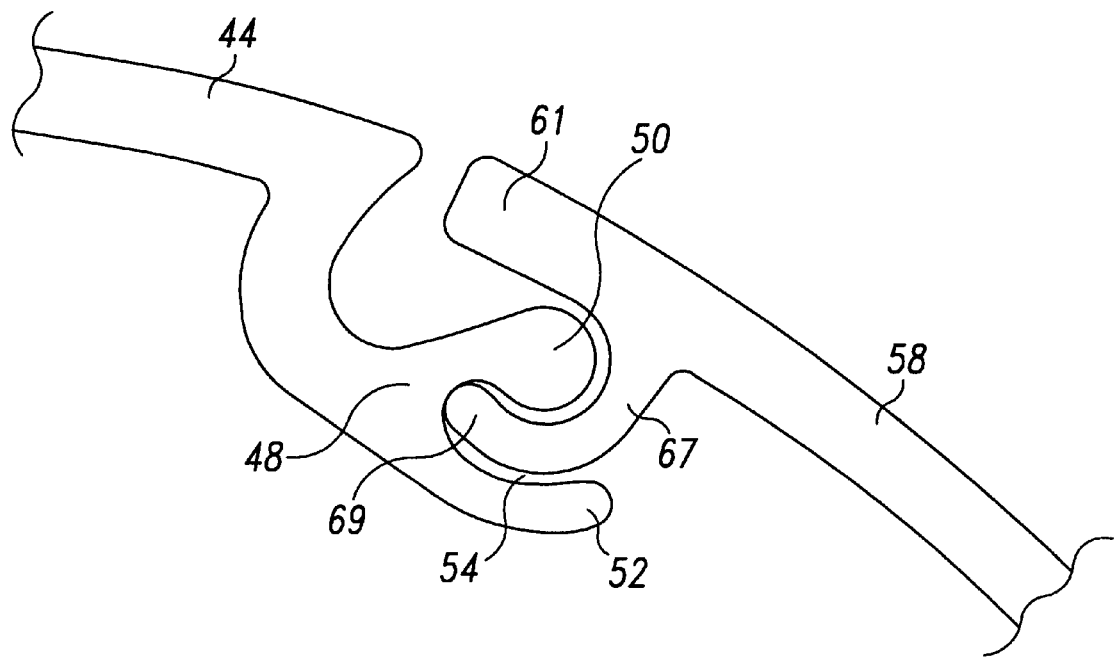
FIG. 6 is an enlarged view of a portion of FIG. 5 that shows the configuration of the roll locking hinge of the fascia and spine in further detail.

The fascia installation process then continues by rotating fascia 14 such that fascia lower edge portion 62 swings downward and toward casing back wall 20. Due to the prior mating of the hinge components on the fascia and casing spine, during its rotation fascia 14 pivots about head 50 of top wall finger 48, and lip 67 inserts farther into arcuate socket 54. As fascia 14 is rotated toward its fully assembled orientation, spring clips 90 need to be retracted or they will be abutted by upturned fascia lip 64. An installer may reach beneath end cap assembly 75 to apply a force on spring clip body 92 to pull latching lip 94 beyond the end 18 of casing spine 12 and into the space within end cap 78. When fascia rotation has continued to such a point that the underside of fascia 14 generally abuts tabs 93 and the end of lip tip region 69 abuts the base surface of socket 54, spring clip body 92 may be released. The resiliency of spring clip 90 causes the released body 92 to be pressed against the side edge of upturned fascia lip 64 and latching lip 94 to be positioned in front of fascia lip 64, thereby latching fascia 14. Fascia 14 has sufficient flexibility to allow the spring clips to be separately handled such that a single installer may latch one end of fascia 14 and then move to the other end of the projection screen system to latch the other end of fascia 14. At this point of fascia installation, fascia 14 and casing spine 12 are arranged as shown in FIGS. 4–6. The body section tip region 61 has been pivoted during roll locking into a position where it blends with top wall segment 44, and the end cap assemblies 74 and 75 do not overlay fascia 14 such that small gaps of about one-thirty-secondth (1/32) of an inch exist at either fascia end.

It will be recognized that because during the roll locking process arcuate lip 67 has been farther inserted into socket 54 as best shown in FIG. 6, fascia 14 has been locked together with casing spine 12. Movement of fascia up or down relative to top wall 22 is prevented by an abutting engagement of arcuate lip 67 with locking finger 48 and 52, respectively, and fascia 14 may not be simply pulled from its hinged connection with top wall 22 due to bulbous finger head 50 impeding a horizontal withdrawal of arcuate lip tip 69. Consequently, if inadvertently bumped such as during cleaning, fascia 14 will not be dislodged from its shown installed position.

The projection screen system is now fully assembled, and as shown diagrammatically in FIG. 5, screen 100 may be lowered to a viewable arrangement by rotating roller 102 to unwind screen 100 therefrom. If on occasion the screen and other system componentry housed within the casing needs to be accessed such as for servicing, fascia 14 may be removed in the following manner without the use of tools and without detaching end cap assemblies 74 and 75 from casing spine 12. While reaching under assemblies 74 and 75 and retracting spring clips 90, a person may pivot fascia 14 outward and upward from the casing arrangement shown in FIG. 5 to the arrangement shown in FIG. 2. After this rotation, fascia 14 may be pulled forward and slightly upward to a point clear of casing spine 12, and fascia 14 may then be placed at a safe location while the system is serviced. Fascia 14 may be reinstalled, or a different fascia installed if a new color fascia is desired, in accordance with the fascia installation process described above.

While this invention has been shown and described as having a preferred design, the present invention may be modified within the spirit and scope of this disclosure. For example, the shown locking hinge configuration is exemplary, as different hinge part shapings, and different ranges of fascia rotation required to lock the components together, may be substituted by those of skill in the art. In addition, the socket and locking lip shown in the Figures as being part of the casing spine 12 and the fascia 14, respectively, naturally may be incorporated into the opposite casing portions within the scope of the present invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A casing for a projection screen system comprising:
    a spine including a top wall comprising a first attachment module;
    a removable fascia for covering a projection screen mounting roller, said fascia comprising a second attachment module;
    wherein one of said first and second attachment modules comprises a locking lip;
    wherein the other of said first and second attachment modules comprises a surface defining a socket adapted to receive said locking lip;
    wherein said locking lip and said socket are structured and arranged such that said locking lip is insertable a first distance into said socket when said fascia is arranged in a first position relative to said spine, and such that said locking lip is insertable a second distance greater than said first distance into said socket when said fascia is moved relative to said spine from said first position to a second position, whereby said first and second attachment modules are locked together when said locking lip is inserted in said socket and said fascia is disposed in said second position to prevent inadvertent removal of said fascia from said spine; and
    at least one end cap attached to said spine at a longitudinal end of said top wall, said at least one end cap when attached to said spine being longitudinally spaced from said fascia to avoid interfering with the moving of said fascia between said first and second positions, wherein said at least one end cap includes a resilient clip adapted to engage said fascia when said fascia is disposed in said second position to prevent moving of said fascia toward said first position.

2. The casing of claim 1 wherein said first attachment module is located proximate a forward edge of said top wall, and wherein said second attachment module is located proximate an upper edge of said fascia.

3. The casing of claim 1 wherein said locking lip and said socket each comprise a curved shape.

4. The casing of claim 1 wherein said first attachment module extends along a longitudinal length of said top wall, and said second attachment module extends along a longitudinal length of said fascia.

5. The casing of claim 1 wherein said first attachment module comprises first and second fingers that together form said socket defining surface, and wherein said first finger comprises a bulbous shape.

6. The casing of claim 1 wherein said fascia comprises a body section with a curved forward facing surface, and wherein said locking lip projects from an underside of said forward facing surface.

7. The casing of claim 6 wherein said top wall comprises a downwardly offset wall region having an end at which is positioned said first attachment module, wherein said first attachment module comprises first and second projecting fingers that together form said socket defining surface, wherein said offset wall region and said first finger define a hollow adapted to insertably receive an upper tip of said fascia body section when said fascia is disposed in said first position.

8. The casing of claim 7 wherein a portion of said top wall adjacent said offset wall region comprises a curved profile that blends into a curved profile of the upper tip of said fascia body section when said fascia is disposed in said second position.

9. The casing of claim 1 wherein said at least one end cap comprises first and second end caps attached to said spine at longitudinally opposite ends of said top wall, each of said first and second end caps when attached to said spine being longitudinally spaced from said fascia to avoid interfering with the moving of said fascia between said first and second positions.

10. The casing of claim 9 wherein each of said first and second end caps includes a resilient clip, wherein a lower portion of said fascia comprises an upturned lip, and wherein said resilient clips are adapted to engage said fascia upturned lip when said fascia is disposed in said second position to prevent moving of said fascia toward said first position.

11. A projection screen system casing comprising:
    a spine including a top wall comprising a first attachment module;

a removable fascia for covering a projection screen mounting roller positioned below said spine top wall, said fascia comprising a second attachment module;

wherein one of said first and second attachment modules comprises a locking lip;

wherein the other of said first and second attachment modules comprises a surface defining a socket adapted to receive said locking lip;

wherein said locking lip and said socket are structured and arranged such that said locking lip is insertable a first distance into said socket when said fascia is arranged in a first position relative to said spine, and such that said locking lip is insertable a second distance greater than said first distance into said socket when said fascia is pivoted about said spine from said first position to a second position, whereby said first and second attachment modules are preliminarily mated together when said locking lip is inserted in said socket and said fascia is disposed in said first position so as to allow removal of said fascia from said spine, and whereby said first and second attachment modules are locked together when said locking lip is inserted in said socket and said fascia is disposed in said second position to prevent inadvertent removal of said fascia from said spine; and wherein said first attachment module comprises first and second fingers that together form said socket defining surface, wherein a portion of said first finger that forms said socket defining surface is convex into said socket, wherein a portion of said second finger that forms said socket defining surface and that faces said first finger portion is concave into said socket such that said socket comprises an arcuate shape, and wherein said locking lip comprises an arcuate shape.

* * * * *